United States Patent [19]

Armbrust et al.

[11] 3,764,631
[45] Oct. 9, 1973

[54] PRODUCTION OF 1-METHYL-3-PHENYLINDANS

[75] Inventors: Herbert Armbrust, Gruenstadt; Gerhard Kilpper, Mannheim; Waldemar Koehler, Ludwigshafen; Hans Juergen Quadbeck-Seeger, Ludwigshafen; Hans Georg Schecker, Ludwigshafen; Hans Juergen Sturm, Gruenstadt, all of Germany

[73] Assignee: Badische Anilin- & Soda-Fabrik Aktiengesellschaft, Ludwigshafen/Rhine, Germany

[22] Filed: Jan. 10, 1972

[21] Appl. No.: 216,765

[30] Foreign Application Priority Data
Jan. 12, 1971 Germany.................. P 21 01 089.9

[52] U.S. Cl............................ 260/668 F, 260/669 R
[51] Int. Cl............................................. C07c 15/20
[58] Field of Search...................... 260/668 F, 669 P

[56] References Cited
UNITED STATES PATENTS
2,249,987  7/1941  Stanley et al.................... 260/668 F
2,646,450  7/1953  Thurber........................... 260/668 F

*Primary Examiner*—Curtis R. Davis
*Attorney*—Johnston, Root, O'Keeffe, Thompson & Shurtleff

[57] ABSTRACT

Production of 1-methyl-3-phenylindans by dimerization of styrenes in the presence of catalysts and oxidizing agents. The products are starting materials for the production of dyes and pesticides.

19 Claims, No Drawings

PRODUCTION OF 1-METHYL-3-PHENYLINDANS

The invention relates to a process for the production of 1-methyl-3-phenylindans by dimerization of styrenes in the presence of catalysts and oxidizing agents.

It is known that in the presence of phosphoric acid, sulfuric acid or other mineral acids and in the presence of solid acid catalysts at elevated temperatures styrene can be dimerized into a mixture of 1,3-diphenylbutene-(1) and 1-methyl-3-phenylindan (J. Org. Chem., volume 19 (1954), pages 17 et seq. and volume 27 (1962), pages 1,636 et seq.; J. Chem. Soc., 1964, pages 1,573 et seq.; Organic Synthesis, Coll. volume IV (J. Wiley, N.Y.), pages 665 et seq.). The reaction is a complicated system of side reactions and secondary reactions. The first stage in the reaction is the dimerization of monomeric styrene into 1,3-diphenylbutene-(1). Cyclization of the trans-form into the indane follows as a secondary reaction. Starting from the cis-form and the trans-form, trimers and other polymers of styrene are formed as further undesirable byproducts.

None of these methods is satisfactory economically on an industrial scale. While at high reaction speeds (space-time yields of about 1 kg of indan per liter of reaction volume per hour) only yields of end product of up to 30 percent of theory together with large amounts of higher linear styrene oligomers are obtained, higher yields are obtained at lower reaction speeds but only small space-time yields of about 0.01 kg per liter per hour.

The object of this invention is to provide a new process for producing 1-methyl-3-phenylindans in a simpler and more economical manner with better yields and space-time yields and in good purity.

We have found that 1-methyl-3-phenylindans of the general formula:

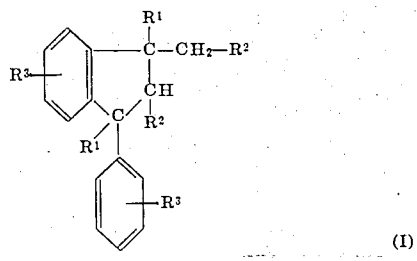

(I)

in which $R^1$, $R^2$ and $R^3$ may be identical or different and each denotes alkyl or hydrogen and $R^3$ may also denote halogen are advantageously obtained by dimerization of a styrene in the presence of a catalyst, when the reaction with a styrene of the general formula:

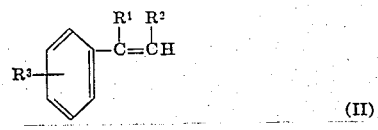

(II)

in which $R^1$, $R^2$ and $R^3$ have the meanings given above is carried out in the presence of an oxidizing agent.

When styrene is used, the reaction may be represented by the following equation:

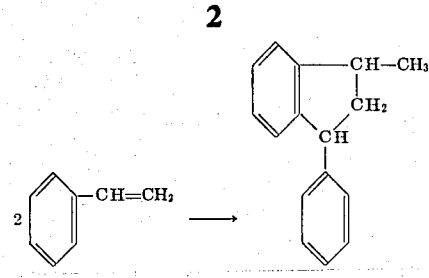

The process according to the invention gives 1-methyl-3-phenylindans in better yields and space-time yields and in good purity by a simpler and more economical method than the prior art methods. High yields of end product can be achieved at good space-time yields. This advantageous result is surprising having regard to the prior art. Oxidation products of the starting substances and therefore reaction mixtures of numerous, difficulty separable components would have been expected to result from the addition of oxidizing agents.

Preferred starting materials of the general formula (II) and consequently preferred end products (I) are those in whose formulae $R^1$, $R^2$ and $R^3$ are identical or different and each denotes alkyl of one to four carbon atoms or hydrogen and $R^3$ may also denote chlorine or bromine. The following are examples of suitable starting materials: styrene, o-chlorostyrene, p-bromostyrene, p-methylstyrene α-methylstyrene, β-propylstyrene, α,β-dimethylstyrene and α-isobutylstyrene. The starting materials may be used in gaseous or liquid form.

The catalysts used may be any of the catalysts suitable for the polymerization of styrene, for example an acid and/or a silicic acid compound. The acids used as a rule are phosphoric acid, sulfuric acid and/or haloalkanoic acids, in the case of a gaseous starting material (II) advantageously in a ratio of 50 to 1,000, particularly of 100 to 500, moles of acid (reckoned as 100 percent per mole of starting material (II). In the case of liquid starting materials (II), 4 to 0.25, particularly 2 to 0.5, parts by volume of acid (reckoned as 100 percent) is used per part by volume of starting material (II). The acids may be used in concentrated form or mixed with water. The following are examples: methaphosphoric acid, pyrophosphoric acid or particularly orthophosphoric acid, conveniently in aqueous solution, with 50 to 90 percent, preferably with 60 to 80 percent, by weight of phosphorus pentoxide; aqueous 50 to 80 percent by weight sulfuric acid; monochloroacetic acid, dichloroacetic acid, trichloroacetic acid and chloropropionic acid. Apropriate mixtures, advantageously of phosphoric acid and sulfuric acid with or without water, preferably in a weight ratio of 70 to 95 percent by weight of phosphoric acid (calculated as 100 percent), 0 to 20 percent by weight of sulfuric acid (calculated as 100 percent) and 0 to 20 percent by weight of water, may be used.

The silicic acid compounds used are advantageously silicates, for example sodium aluminum silicate, calcium aluminum silicate, bleaching clays, fuller's earth, clays, kaolin, allophanes, zeolites, montmorillonite, pumice, Florida earth, asbestos, mullite, bentonite; silicic acid, silica gel or infusorial earth. The silicic acid compound may also contain metal oxide, for example aluminum, zirconium or magnesium oxide.

Suitable solid phosphoric acid catalysts include metaphosphoric, pyrophosphoric and/or preferably orthophosphoric acid which may conveniently be used as such or in the form of an aqueous solution applied to a carrier. The phosphoric acid may also be in the form of a polyphosphoric acid, for example with 72 to 88 percent by weight of $P_2O_5$. The carrier may advantageously be one of the said silicic acid compounds, preferably precipitated silicic acid, silica gel or infusorial earth, but bauxite, magnesite, aluminum oxide, activated carbon and quartz may also be used as carrier. The phosphoric acid catalysts contain the phosphoric acid (calculated as orthophosphoric acid irrespective of the actual constitution) generally in an amount of 10 to 80 percent, preferably 30 to 80 percent, by weight of acid based on the carrier material. The production of these catalysts is carried out by conventional methods, for example by applying the acid to a carrier, drying and calcination, for example at from 200° to 900°C in a reducing, oxidizing or inert atmosphere.

The particle size of the solid catalysts is preferably from 1 to 10 millimeters. It may have any shape, for example spherical or granular. The solid catalyst is generally used in an amount of from 10 to 1,000 percent, preferably from 80 to 200 percent, by weight based on the amount of starting material (II) supplied to the reaction per hour. Houben-Weyl, "Methoden der organischen Chemie," volume 4/2, pages 142 et seq. and Ullmanns "Encyklopaedie der technischen Chemie", volume 9, pages 271 et seq, may be referred to as regards the preparation of the catalysts.

The invention is based on the observation that surprisingly oxidizing agents promote the dimerization and simultaneously the cyclization of the styrenes to the corresponding indans. The oxidizing agents, which are preferably inorganic, may be gaseous, solid or liquid. It is advantageous to use the following compounds: peroxo compounds, for example hydrogen peroxide, particularly in 30 to 50 percent by weight aqueous solution, alkali metal peroxides, hydroperoxides and peroxohydrates such as potassium hydroperoxide, lithium peroxohydrate, sodium peroxide, alkaline earth metal peroxohydrates and peroxides such as magnesium peroxide, calcium peroxide, barium peroxide, calcium peroxohydrate and magnesium peroxohydrate; hydrogen peroxide adducts such as sodium metaborate-3-hydrate-1-peroxohydrate, sodium diphosphate-3-peroxohydrate, urea peroxohydrate; peroxo acids and their salts such as sodium peroxocarbonate, peroxomonosulfuric and peroxodisulfuric acids; organic peroxides and peroxyacids such as diacetyl peroxide, benzoic peracid, dicumyl peroxide, tert.-butyl hydroperoxide, cyclohexanone peroxide; ozone; lead tetraoxide, lead tetraacetate; N-bromosuccinimide; halogen oxyacids and their salts such as sodium hypobromite, sodium chlorite, sodium chlorate, chloric acid, potassium chlorate, potassium bromate, periodic acid, sodium iodate and hypochlorous acid; chromium compounds such as chromium trioxide, potassium bichromate, ammonium bichromate, chromyl chloride; oxidizing metal salts such as ferric chloride, vanadium pentoxide chloride, ceric sulfate, mercury nitrate, potassium ferricyanide, cupric chloride, cupric sulfate and manganese tetraacetate; permanganates such as potassium permanganate; metal oxides such as cupric oxide, vanadium pentoxide, ferric oxide, manganese dioxide, molybdenum trioxide, mercuric oxide, lead dioxide, selenium dioxide, osmium tetroxide, ruthenium tetroxide, argentous oxide; nitrous acid, nitrosylsulfuric acid, nitric acid and their salts, for example sodium nitrite, silver nitrate, potassium nitrate, sodium nitrate, lithium nitrate, calcium nitrate, magnesium nitrate, nickel nitrate, chromium nitrate, copper nitrate, cobalt nitrate, cerium nitrate, thorium nitrate, bismuth nitrate, iron nitrate and mercury nitrate; quinone and derivatives, for example chloranil. Appropriate mixtures of oxidizing agents or of oxidizing agents and activators, for example hydrogen peroxide and ferrous salts, ammonium molybdate, ammonium tungstate, hydrogen peroxide and osmium, vanadium and/or chromium oxides, molybdic acid and nitric acid, potassium ferricyanide and nitric acid may also be used. It is also possible to use ultraviolet light, for example in the case of peroxides as oxidizing agents. Oxygen or mixtures containing the same, for example air, alone or with the use of catalysts, for example the oxides of iron, chromium, aluminum, molybdenum, vanadium, tungsten or zinc, with or without alkali metal oxides, and appropriate mixtures; bromine or bromides; cobalt, copper, manganese, lead, cerium, mercury, or barium salts, for example the corresponding acetates, sulfates and chlorides; nickel, platinum, palladium, silver and zinc may also be used. The oxidizing agent is advantageously used in a ratio of 0.001 to 0.5 mole, perferably from 0.05 to 0.1 mole, per mole of starting material (II) and in the case when oxygen is used as the oxidizing agent in a ratio of 0.05 to 2 moles.

In an advantageous embodiment of the process there is used not only an oxidizing agent but also a polymerization inhibitor, generally the inhibitors described in co-pending application Ser. NO. 149,779 filed June 3, 1971. Any substance which prevents or appreciably retards the polymerization of the monomers and thus has a stabilizing effect in relation to the monomers may be used as the polymerization inhibitor. The substance may be gaseous, solid or liquid. Those which inhibit the polymerization of vinyl compounds are preferred. It is advantageous to use the following inhibitors: thioureas, for example thiourea, methylthiourea, phenylthiourea, N,N-diphenylthiourea, N,N'-diphenylthiourea, N-methyl-N-(p-toluyl)-thiourea, S-benzyl-N-phenylisothiouronium picrate, S-methyldithiobiuret hydrochloride, phenylmethylthiourea, 2,4-dimethoxyphenylthiourea, 4-methoxyphenylthiourea, di-n-butylthiourea, 1-benzoylthiosemicarbazide, and dithiobiuret; phenols, thiophenols and their ethers, for example hydroquinone monomethyl ether, 4-t-butylpyrocatechol, N-benzyl-p-aminophenol, o-aminophenol; sulfur-containing heterocyclic compounds with sulfur as a substituent or in a side chain on the heterocyclic ring, for example 2-mercaptobenzimidazole, 2-mercapto-4-anilinoquinazoline and 2-thiocyanomethylbenzimidazole, or with a sulfur atom in the heterocyclic ring, for example phenothiazine, thionaphthene, 2-mercaptobenzothiazole, 2-aminobenzothiazole, 3-aminobenzoisothiazole, 2-methylbenzothiazole, diphenylene sulfide, 2,5-dimercapto-1,3,4-thiadiazole and tetramethylenetrithione; substituted aromatic amines, for example N-phenyl-α-naphthylamine and N-phenyl- β-naphthylamine; nitroso compounds, for example o-nitrosophenol, m-nitrosophenol, p-nitrosophenol, N-nitrosophenylhydroxyammonium salt (cupferron), nitrogen monoxide and dinitrogen tetroxide; organic phosphorus compounds, for example triphenyl phosphine and triphenyl phosphite; thiocarboxamides, for example thioacetamide, anthranilic thiamide, 2-amino-5-nitrothiobenzamide, 2-amino-3-bromo-5-nitrothiobenzamide, 2-amino-3,5-dibromothiobenzamide, thiobenzamide; and corresponding mixtures. Generally from $10^{-5}$ to $10^{-2}$, preferably from $10^{-4}$ to $10^{-3}$, mole of polymerization inhibitor is used per mole of starting material (II). The oxidizing agent and inhibitor may be combined in any suitable manner; ratios by weight of 0.5 to 50 percent by weight of inhibitor, based on oxidizing agent, are advantageous. For example molybdic acid and phenothiazine or phenylthiourea; nitric acid and phenylthiourea, potassium ferricyanide and thiourea; chromium trioxide and thionaphthene; hydrogen peroxide and N-phenyl-α-naphthylamine; potassium nitrate and N-phenyl-β-naphthylamine or dithiobiuret may be used together. Similarly oxidizing agents may be used which may at the same time serve as polymerization inhibitors, for example nitrogen monoxide, dinitrogen tetroxide and potassium nitrosodisulfonate.

The reaction may be carried out at atmospheric or superatmospheric pressure, continuously or batchwise, generally at a temperature of from +40° to +200°C, preferably from +50° to +150°C. Organic solvents which are inert under the reaction conditions, for example aliphatic hydrocarbons such as n-pentane, n-heptane, cycloaliphatic hydrocarbons such as cyclohexane, or mixtures of the same, may be used if desired.

The reaction may be carried out as follows: Any apparatus in which the styrene can be contacted intimately with the catalyst may be used, in the case of a liquid catalyst such as the said acids for example a packed tower, a bubble tray column, a cascade reactor, sieve plate column, Oldershaw column, glass plate column, bubble cap tray column or valve tray column. Gaseous or liquid styrene is dimerized cocurrently or countercurrently with the acid in the reactor at the reaction temperature. In accordance with the type of reactor, the acid, oxidizing agent and if desired the inhibitor may be placed therein and the styrene passed therethrough while mixing well. When a column is used the acid is advantageously passed continuously through the reactor, the throughput of liquid advantageously being from 10 to 100 m³ per m² of column cross-section per hour. After the acid has left the reactor it may be separated from the organic reaction product and returned to the reactor. The vapor speed of the gaseous styrene is advantageously from 0.1 to 2.0 meters per second based on the cross-section of the column. The residence time in the reactor is as a rule from 0.1 to 5 minutes. The reaction mixture is then separated from the acid in a separating plant downstream of the reactor and the end product is isolated by a conventional method, for example by fractional distillation. Unreacted starting material and the acid are returned to the reaction. The starting material is generally supplied to the reactor in gaseous or liquid condition. It is also possible to supply it in the liquid state, to vaporize it within the reactor and only then to contact it with the acid and so begin the reaction.

A mixture of starting material (II), acid, oxidizing agent with or without inhibitor may be reacted continuously or batchwise in a stirred vessel or a cascade of stirred vessels at the reaction temperature for 30 minutes to 2 hours. It is then convenient to use a temperature of from 30°C to the boiling point of the styrene concerned at the reaction pressure, for example 0.3 to 3.0 atmospheres.

The following is also an advantageous embodiment of the reaction; the styrene (II) is dimerized at the reaction temperature in the presence of an acid, the appropriate oxidizing agent and if desired an inhibitor in the specified concentrations in a stirred vessel or in a stirred cascade with intense mixing, advantageously with a stirring energy of from 3 to 8 kw/m³. The residence time of the reaction mixture in the reaction chamber is generally from 20 minutes to 2 hours. At the beginning the mixture of the reactants may be prepared at the reaction temperature or at a lower temperature and then brought to the reaction temperature. The individual stirred vessels in a cascade of the same may be kept at different reaction temperatures.

The portion of the reaction mixture which is continuously withdrawn passes to phase separation. The separated aqueous phase, which contains the acid, may be reused immediately for the reaction. The acid may however be prepared in the conventional way, for example by filtration, centrifuging, distillation or extraction. Each of the vessels in the cascade of stirred vessels may be supplied by way of its own acid circulation or all the vessels may be supplied by way of a common circulation. In the former case the concentration of the acid, for example, may be varied from vessel to vessel. The end product is isolated by a conventional method, for example by distillation, from the organic phase.

In the case of solid catalysts the starting materials (II) may be passed in liquid or gaseous condition at the reaction temperature continuously over a bed of catalyst in a tubular reactor. Batchwise, mixtures of starting material (II) and solid catalyst may be reacted in a similar way as in the case of liquid acid catalysts. The catalyst may be suspended in the liquid starting material (II) or fluidized (fluidized bed).

The oxidizing agent and any polymerization inhibitor used may be supplied to the reaction by any method, for example mixed with the starting material (II) or the solid catalyst, in solution or suspension in the liquid catalyst, or separately. During the separation of the end product, the oxidizing agent (and any polymerization inhibitor) may be separated according to its constitution from the organic phase and reused or in the case of an oxidizing agent which is soluble in acid may be returned to the reaction with the acid.

The compounds which can be prepared by the process of the invention are valuable starting materials for the production of dyes and pest control agents. Reference is made to the above-mentioned publications and to German patent application No. P 19 34 086.4, patent application No. P 19 34 055.7 and patent application P 19 15 385.6.

The parts given in the following examples are parts by weight. Parts by weight bear the same relation to parts by volume as the kilogram to the liter.

EXAMPLES 1 to 53

(Batchwise liquid-liquid dimerization

Method A: 100 parts by volume of phosphoric acid (98 percent by weight) is heated to 50° to 60°C in a stirred vessel. At this temperature, the oxidizing agent and any polymerization inhibitor are added in the parts specified in the following Table (column heated "Additive") and then 104 parts of styrene over 40 minutes in portions. The end product (I) (1-methyl-3-phenylindan) is then separated by extraction of the reaction mixture with 100 parts of methylene chloride followed by fractional distillation of the extract. The composition of the distillate is determined by gas chromatography. The total yield of dimers (column D), of linear styrene dimers (column LSD) and the yield in a percentage of theory of the end product (column EP) are given in the following Table for the various oxidizing agents. Yields of D and EP are given in percent of theory based on starting material (II) and yields of LSD are given in percent by weight based on D.

Method B: Styrene is diluted with an equal weight of cyclo-hexane and then supplied to the reaction. In other respects the method is analogous to Method A.

In the following Table, the following abbreviations are used: E = Example; C = Comparative Example; M = method used; P = parts; all percentages in the table are by weight.

| E C | Additive P | M | D | LSD | EP |
|---|---|---|---|---|---|
|  |  | A | 66 | 10 | 60 |
|  |  | B |  |  |  |
| 1 | $H_2MoO_4$ (85% $MoO_3$)1.0 | A | 79.8 | 10.2 | 71.7 |
| 2 | ditto 5.0 | B | 91.4 | 15.2 | 77.5 |
| 3 | $K_3Fe(CN)_6$1.0 | A | 83.7 | 13.1 | 72.7 |
| 4 | $K_3Fe(CN)_6$5.0 | A | 86.0 | 12.8 | 75.0 |
| 5 | $H_2O_2$ (30%)1.0 | A | 85.6 | 13.7 | 74.0 |
| 6 | $KMnO_4$1.0 | B | 80.7 | 7.1 | 75.0 |
| 7 | $NaNO_2$0.1 | B | 81.3 | 18.6 | 66.3 |
| 8 | $CrO_3$1.0 | A | 71.2 | 9.4 | 64.6 |
| 9 | $VOCl_3$0.1 | B | 76.0 | 10.3 | 68.2 |
| 10 | $V_2O_5$1.0 | B | 74.2 | 11.3 | 65.7 |
| 11 | $V_2O_5$5.0 | B | 85.6 | 14.2 | 73.5 |
| 12 | $AgNO_3$0.1 | A | 74.2 | 13.4 | 64.2 |
| 13 | $HNO_3$ (65%)0.1 | A | 83.6 | 7.0 | 77.8 |
| 14 | $HNO_3$ (65%) 1.0 | B | 87.6 | 9.6 | 79.2 |
| 15 | $KNO_2$0.1 | A | 81.6 | 6.9 | 76.1 |
| 16 | $KNO_3$0.1 | B | 88.8 | 8.9 | 81.0 |
| 17 | $NaNO_3$0.1 | B | 85.6 | 6.6 | 80.0 |
| 18 | $LiNO_3$0.1 | B | 84.6 | 6.0 | 79.4 |
| 19 | $Ca(NO_3)_2$0.1 | B | 80.6 | 5.7 | 76.0 |
| 20 | $Mg(NO_3)_2$0.1 | B | 81.6 | 6.6 | 76.2 |
| 21 | $Na_2Cr_2O_7$0.1 | B | 71.0 | 9.3 | 64.4 |
| E |  Additive P | M | D | LSD | EP |
| 22 | Chloranil 0.1 | B | 75.3 | 6.5 | 70.5 |
| 23 | $Ni(NO_3)_2$0.1 | B | 83.6 | 7.0 | 77.7 |
| 24 | $Cr(NO_3)_2$0.1 | B | 77.4 | 7.2 | 72.0 |
| 25 | $Cu(NO_3)_2$0.1 | B | 73.5 | 9.8 | 66.2 |
| 26 | $Co(NO_3)_2$0.1 | B | 79.4 | 8.5 | 72.7 |
| 27 | $Ce(NO_3)_3$0.1 | B | 84.2 | 7.3 | 78.1 |
| 28 | $Th(NO_3)_4$0.1 | B | 81.7 | 7.7 | 75.3 |
| 29 | $Bi(NO_3)_3$0.1 | B | 74.2 | 6.7 | 69.2 |
| 30 | $NaClO_3$0.1 | A | 72.2 | 4.7 | 68.6 |
| 31 | $KClO_3$0.1 | A | 67.5 | 6.2 | 63.0 |
| 32 | $Fe(NO_3)_3$0.1 | B | 82.0 | 6.8 | 76.6 |
| 33 | $HgNO_3$0.1 | B | 83.7 | 9.6 | 75.4 |
| 34 | $H_5IO_6$0.1 | B | 86.1 | 10.7 | 77.0 |
| 35 | $BaO_2$0.1 | B | 79.8 | 8.7 | 72.9 |
| 36 | $NOHSO_4$0.1 | B | 84.6 | 9.5 | 76.6 |
| 37 | N-bromosuccinimide 0.1 | A | 75.0 | 8.2 | 68.9 |
| 38 | $Ce(SO_4)_2$0.1 | B | 79.8 | 7.9 | 73.6 |
| 39 | $NaBO_2\cdot3H_2O\cdot H_2O_2$1.0 | B | 74.1 | 8.2 | 68.0 |
| 40 | HgO 0.1 | B | 75.9 | 7.0 | 70.6 |
| 41 | $KBrO_3$0.1 | B | 74.1 | 9.9 | 66.8 |
| 42 | $(NH_4)_2CrO_4$0.1 | B | 82.2 | 8.3 | 75.4 |
| 43 | $SeO_2$0.1 | A | 78.9 | 8.6 | 72.1 |
| 44 | $PbO_4$0.1 | A | 72.2 | 7.7 | 66.6 |
| 45 | $NaIO_3$0.1 | A | 68.4 | 8.2 | 62.6 |
| 46 | $Hg(NO_3)_2$0.1 | B | 77.8 | 10.5 | 69.5 |
| 47 | $O_2$ (in the form of a 0.05 phosphoric acid solution saturated with $O_2$) | A B | 68.2 | 7.8 | 62.9 |
| 48 | $H_2MoO_4$ (85%) +0.5 $HNO_3$ (65%)0.1 | B | 86.0 | 8.2 | 79.0 |
| 49 | $K_3Fe(CN)_6$1.0 + $HNO_3$ (65%)0.1 | A B | 87.2 | 9.0 | 79.4 |
| 50 | $H_2MoO_4$ (85%)5.0 + phenothiazine 0.1 | B | 78.0 | 13.8 | 67.3 |
| 51 | $H_2MoO_4$ (85%)5.0 | B | 87.9 | 14.5 | 75.2 |
| 52 | + phenothiazine 0.5 $H_2MoO_4$ (85%)5.0 + phenylthiourea 0.1 | B | 85.0 | 11.2 | 75.5 |
| 53 | $HNO_3$ (65%)0.1 + phenothiazine 0.1 | A B | 82.2 | 8.5 | 73.7 |

EXAMPLE 54

(Continuous liquid-liquid dimerization)

55 parts per hour of styrene is passed into a continuously stirred apparatus containing 100 parts of phosphoric acid (98 percent by weight), 0.14 part of nitric acid (100 percent by weight) and 55 parts of 1-methyl-3-phenylindane. The reaction mixture is mixed well and the reaction temperature is 70°C. 155 parts per hour of reaction mixture is withdrawn and supplied through a lateral outlet to a separating vessel. The phosphoric acid separating per hour as the lower phase (100 parts) has 65 percent by weight nitric acid (0.0075 part per hour) added to it and is returned to the reactor. The organic phase (55 parts per hour) is fractionally distilled. 44.8 parts per hour (equivalent to 81.7 percent of theory based on reacted styrene) of 1-methyl-3-phenylindan having a boiling point of 150°C at 6.5 mm, 3.9 parts per hour (equivalent to 7.2 percent of theory based on reacted styrene) of 1,3-diphenylbutene-1, 6.1 parts per hour of higher styrene oligomers are obtained. The styrene is reacted to the extent of 99.7 percent in the reaction.

EXAMPLE 55

55 parts of styrene is passed per hour into a continuously operating stirred apparatus containing a solution of 98 parts of phosphoric acid (100 percent) with 2 parts of dissolved molybdenum tri-oxide and 55 parts of 1-methyl-3-phenylindane. The reaction mixture is stirred well. The reaction temperature is 70°C. 155 parts per hour of a two-phase reaction mixture (containing 55 parts of organic phase and 100 parts of phosphoric acid) is passed through a lateral outlet into a separating vessel kept at 130°C. The acid separating as the lower phase is returned to the reactor. The organic phase is fractionally distilled. The styrene is reacted to the extent of 97.5 percent in the reaction. 42.5 parts (equivalent to 79.3 percent of theory based on styrene reacted) of 1-methyl-3-phenylindane having a boiling point of 150°C at 6.5 mm, 3.3 parts (equivalent to 6.2 percent of theory based on styrene reacted) of 1,3-diphenylbutene-1 and 7.8 parts of higher styrene oligomers are obtained.

In a continuous operation of more than 3 days, reduction of the molybdic acid to lower stages of oxidation may take place. 0.01 part per hour of nitric acid is therefore added. The yield of end product is equivalent to the abovementioned yields.

EXAMPLE 56

Adopting the method of Example 55, the following oxidizing agent set out in Table 2 is used in the reaction instead of molybdenum trioxide. The columns of Table 2 correspond to those in Table 1.

TABLE 2

| Additive | P | Parts added per hour | D | LSD | EP |
|---|---|---|---|---|---|
| $H_2O_2$ (60%) | 0.3 | 0.05 | 89.6 | 8.0 | 82.4 |

EXAMPLE 57

120 parts of α-methylstyrene is diluted with 100 parts by volume of cyclohexane and added in portions over 40 minutes at 60° to 70°C. to 100 parts by volume of 98 percent by weight phosphoric acid in which 0.1 part of nitric acid (65 percent) has previously been added. The organic phase is separated from the two phase reaction mixture and distilled. 106 parts of 1,1-dimethyl-3-methyl-3-phenylindan (88.5 percent of theory) is obtained having a melting point of 52°C.

We claim:

1. A process for the production of a 1-methyl-3-phenylindan of the general formula:

in which $R^1$, $R_2$ and $R_3$ may be identical or different and each denotes alkyl or hydrogen and $R^3$ may also denote halogen by dimerization of a styrene in the presence of a catalyst wherein the reaction with a styrene of the general formula:

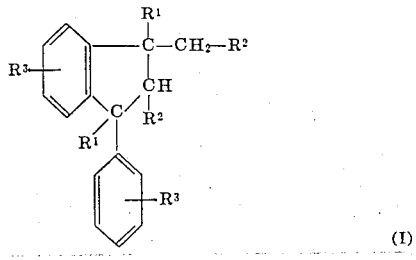

(I)

in which $R^1$, $R^2$ and $R^3$ have the meanings given above is carried out in the presence of a further compound acting as an oxidizing agent.

2. A process as claimed in claim 1 carried out in the presence of a silicic acid compound, phosphoric acid, sulfuric acid and/or a haloalkanoic acid.

3. A process as claimed in claim 1 carried out in the presence of a gaseous starting material (II) and in a ratio of from 50 to 1,000 moles of acid (calculated as 100 percent) per mole of starting material (II).

4. A process as claimed in claim 1 carried out in the presence of a liquid starting material (II) and from 4 to 0.25 part by volume of acid (calculated as 100 percent) per part by volume of starting material (II).

5. A process as claimed in claim 1 carried out with acid in a ratio by weight of 70 to 95 percent by weight of phosphoric acid (calculated as 100 percent), 0 to 20 percent by weight of sulfuric acid (calculated as 100 percent) and 0 to 20 percent by weight of water.

6. A process as claimed in claim 1 carried out with oxidizing agent in a ratio of 0.001 to 0.5 mole per mole of starting material (II).

7. A process as claimed in claim 1 carried out with oxygen as oxidizing agent in a ratio of 0.05 to 2 moles per mole of starting material (II).

8. A process as claimed in claim 1 carried out in the presence of a polymerization inhibitor.

9. A process as claimed in claim 1 carried out in the presence of from $10^{-5}$ to $10^{-2}$ mole of a polymerization inhibitor per mole of starting material (II).

10. A process as claimed in claim 1 carried out in the presence of a polymerization inhibitor in a ratio by weight of 0.5 to 50 percent by weight based on oxidizing agent.

11. A process as claimed in claim 1 carried out at a temperature of from 40° to 200°C.

12. A process as claimed in claim 1 carried out at a temperature of from 50° to 150°C.

13. A process as claimed in claim 1 carried out in the presence of a solvent which is inert under the reaction conditions.

14. The process as claimed in claim 1 wherein the oxidizing agent is selected from the group consisting of hydrogen peroxide, potassium hydroperoxide, lithium peroxohydrate, sodium peroxide, magnesium peroxide, calcium peroxide, barium peroxide, calcium peroxohydrate, magnesium peroxohydrate, sodium metaborate-3-hydrate-1-peroxohydrate, sodium diphosphate-3-peroxohydrate, urea peroxogydrate, sodium peroxocarbonate, peroxomonosulfuric, peroxodisulfuric acids; diacetyl peroxide, benzoic peracid, dicumyl peroxide, tert.-butyl hydroperoxide, cyclohexanone peroxide; ozone; lead tetraoxide, lead tetraacetate; N-bromosuccinimide; sodium hypobromite, sodium chlorite, sodium chlorate, chloric acid, potassium chlorate, potassium bromate, periodic acid, sodium iodate, hypochlorous acid; chromium trioxide, potassium bichromate, ammonium bichromate, chromyl chloride; ferric chloride, vanadium pentoxide chloride, ceric sulfate, mercury nitrate, potassium ferricyanide, cupric chloride, cupric sulfate, manganese tetraacetate; potassium permanganate; cupric oxide, vanadium pentoxide ferric oxide, manganese dioxide, molybdenum trioxide, mercuric oxide, lead dioxide, selenium dioxide, osmium tetroxide, ruthenium tetroxide, argentous oxide; nitrous acid, nitrosylsulfuric acid, nitric acid, sodium nitrite, silver nitrate, potassium nitrate, sodium nitrate, lithium nitrate, calcium nitrate, magnesium nitrate, nickel nitrate, chromium nitrate, copper nitrate, cobalt nitrate, cerium nitrate, thorium nitrate, bismuth nitrate, iron nitrate, mercury nitrate; quinone, chloranil, ultra violet light, and oxygen.

15. A process as claimed in claim 14 wherein the process is carried out in the presence of a silicic acid compound, phosphoric acid, sulfuric acid and/or a haloalkanoic acid, wherein the oxidizing agent is present in a ratio of 0.001 to 0.5 mole per mole of starting material (II) and wherein the process is carried out at a temperature of 40° to 200°C.

16. The process as claimed in claim 1 wherein said oxidizing agent is a mixture selected from the group consisting of hydrogen peroxide and ferrous salts, ammonium molybdate or ammonium tungstate; hydrogen peroxide and osmium, vanadium and/or chromium oxides; molybdic acid and nitric acid; and potassium ferricyanide and nitric acid.

17. The process as claimed in claim 1 wherein said oxidizing agent is oxygen or air together with one or more catalysts selected from the group consisting of oxides of iron, chromium, aluminum, molybdenum, vanadium, tungsten and zinc, with or without alkali metal oxides.

18. The process as claimed in claim 1 wherein said oxidizing agent is oxygen or air together with a catalyst selected from the group consisting of nickel, platinum, palladium, silver, zinc, bromine and bromides.

19. The process as claimed in claim 1 wherein said oxidizing agent is oxygen or air together with catalysts selected from the group consisting of acetates, sulfates and chlorides of cobalt, copper, manganese, lead, cerium, mercury and barium.

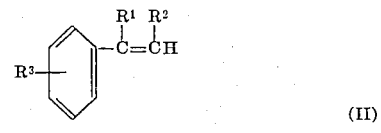

(II)

* * * * *

UNITED STATES PATENT OFFICE
CERTIFICATE OF CORRECTION

Patent No. 3,764,631          Dated October 9, 1973

Inventor(s) Herbert Armbrust et al

It is certified that error appears in the above-identified patent and that said Letters Patent are hereby corrected as shown below:

Column 2, line 41, insert -- ) -- after "percent".

Column 2, line 53, "Apropriate" should read -- Appropriate --.

Column 7, table, between item "21" and "E" space should be provided to indicate a new table.

Column 7, table, example 39, column 3, "1.0" should read -- 0.1 --.

Column 9, line 14, "$R_2$ and $R_3$" should read -- $R^2$ and $R^3$ --.

Column 9, line 13, insert

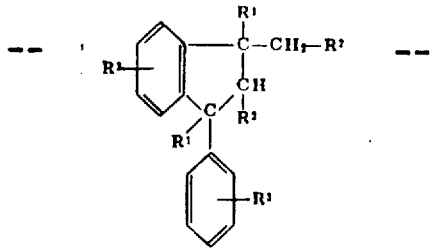

beneath "formula".

Column 9, line 19-29, delete

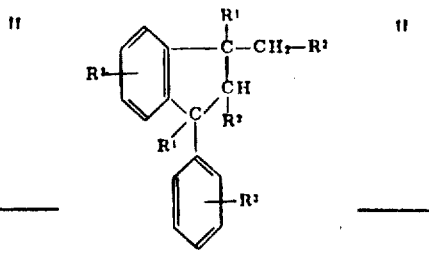

UNITED STATES PATENT OFFICE
CERTIFICATE OF CORRECTION

Patent No. 3,764,631   Dated October 9, 1973

Inventor(s) Herbert Armbrust et al

It is certified that error appears in the above-identified patent and that said Letters Patent are hereby corrected as shown below:

and insert

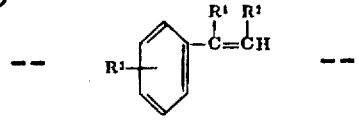

-- after "formula" (line 18).

Column 10, line 22, insert -- , -- after "pentoxide".

Signed and sealed this 17th day of September 1974.

(SEAL)
Attest:

McCOY M. GIBSON JR.
Attesting Officer

C. MARSHALL DANN
Commissioner of Patents